United States Patent

[11] 3,634,597

[72] Inventors: Gerhard Ziemek, Hanover; Bernd Eilhardt, Vinnhorst, both of Germany
[21] Appl. No.: 53,185
[22] Filed: July 8, 1970
[45] Patented: Jan. 11, 1972
[73] Assignee: Kabel-und Metallwerke Gutehofnungshutte Aktiengesellschaft, Hanover, Germany
[32] Priorities: July 10, 1969
[33] Germany
[31] P 19 40 147.9; Aug. 7, 1969, Germany, No. P 19 35 049.3

[54] CONDUCTOR SYSTEM FOR SUPERCONDUCTING CABLES
9 Claims, 4 Drawing Figs.
[52] U.S. Cl. .................................................... 174/15, 174/34, 174/115, 174/DIG. 6
[51] Int. Cl. .................................................... H01b 7/02, H01b 7/34
[50] Field of Search .................................................... 174/15, 15 C, 13, 24, 34, 33, 28, 115, 117

[56] References Cited

UNITED STATES PATENTS

| 3,332,813 | 7/1967 | Clarke | 174/28 X |
| 3,382,315 | 6/1968 | Minnich | 174/34 |
| 3,514,524 | 5/1970 | Buchhold | 174/117 X |
| 3,515,793 | 6/1970 | Aupoix et al. | 174/15 X |

Primary Examiner—Lewis H. Myers
Assistant Examiner—A. T. Grimley
Attorney—Philip G. Hilbert

ABSTRACT: A conductor system for superconducting electrical cables, wherein a tubular member supports on its inner surface superconducting conductor strands disposed at an angle to the axis of the support member; the strands being adherent to the support member at spaced points along the length of the strand and the strand portions between said points being nonadherent to the support member.

PATENTED JAN 11 1972 3,634,597

INVENTORS
Gerhard Ziemek
Bernd Eilhardt
BY
Philip E. Hilbert
ATTORNEY

CONDUCTOR SYSTEM FOR SUPERCONDUCTING CABLES

Supercooled electrical cables for the transmission of electrical energy are known in the art as comprising essentially conducting strands disposed interiorly of a tubular member through which a cooling medium flows, such as liquid helium or the like. Heat insulation is provided for the tubular member in the form of a plurality of concentric tubings enclosing the tubular member with annular spaces therebetween. Such tubings may be smooth walled or corrugated.

In such known cable constructions, the innermost annular space is maintained as a vacuum. The next annular space is filled with a coolant such as liquid nitrogen or helium. The outermost annular space is then also maintained as a vacuum. Here the conducting strand may take the form of a pair of concentric conductors wherein the outer surface of the inner conductor and the inner surface of the outer conductor carry the selected superconducting layers.

It is also known in the art to provide several conducting strands connected electrically in parallel where the strands have a reduced cross section as compared to that of a single strand of larger cross section. The superconducting materials are known in the art, including lead, niobium and niobium alloys. The conductor of the superconducting cable can be formed of such materials, or with the energy transmission resulting from a skin effect, as a thin layer on a base of metallic or synthetic resin material; the thin layer being applied by electrolysis, vacuum deposition or the like.

To support the superconducting strands within the concentric tubular structure set forth above, it has been proposed to use various spacer elements. However such spacer elements have a number of problems, particularly when used with multiphase conductors.

It has also been suggested to provide in the innermost of the concentric tubings a bar of selected cross section for carrying the conductor strand or strands thereon in a manner to dispose the strands at an angle to the cable axis. However, such a bar interferes with the flow of coolant through the tubing with adverse results and further, presents problems because of the difference in thermal expansion coefficients of the bar which is formed of synthetic resin, and the metallic strands.

Accordingly, an object of this invention is to provide an improved arrangement of conductors in a superconducting cable, wherein such conductors are mounted on the inner surface of a tubular support; the conductors extending at an angle to the longitudinal axis of the support.

Another object of this invention is to provide a conductor arrangement of the character described, wherein the coolant may make maximum surface contact with the conductors, to thereby improve heat-transfer characteristics and stabilization of cooling effects.

Yet another object of this invention is to provide a conductor arrangement of the character described, wherein the conductors do not interfere with normal flow of coolant; the conductors being uniformly distributed over the inner surface of the tubular support.

Still a further object of this invention is to provide a conductor arrangement of the character described wherein the tubular support member is formed with openings in the wall thereof to thereby permit the passage of coolant therethrough for saturating insulation disposed exteriorly of the support member and thereby increasing the dielectric strength thereof.

Other objects of this invention will in part be obvious and in part hereinafter pointed out.

DESCRIPTION OF THE PREFERRED EMBODIMENTS

Figure 1:
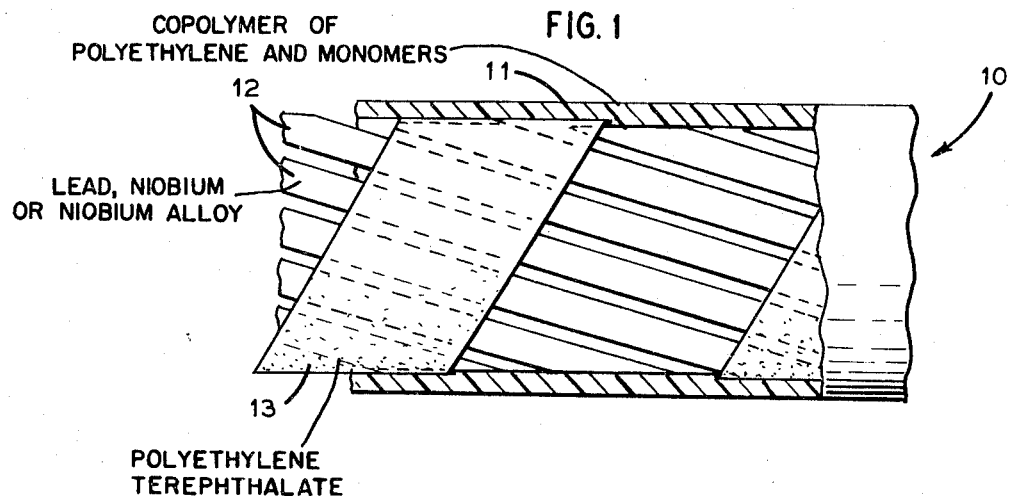
FIG. 1 is a side elevational view, with parts broken away and parts in section, showing a conductor system for superconducting cables, embodying the invention.

As shown in FIG. 1, 10 designates a conductor system for a superconducting cable, embodying the invention. The same comprises a tubular support member 11 formed of a synthetic resin material. Arranged interiorly of member 11 are superconducting strands or conductors 12, which extend at an angle to the longitudinal axis of the support member 11. The conductors 12 are formed of superconducting material such as lead, niobium or niobium alloys and may take the form of thin coatings or layers on a suitable carrier. The conductors 12 are in the form of tapes having a long lay with respect to the axis of member 11 and a suitable spacing in accordance with the electrical requirements of the superconducting cable.

Interposed between the conductors 12 and the inner surface of support member 11 is a helically wound synthetic resin foil 13 with a selected spacing between the turns thereof. Such foil 13 may be of polyethyleneterephthalate.

The tubular support member 11 is formed of selected synthetic resins having good adherence to metal, such as copolymers of polyethylene and monomers, as set forth in detail in U.S. Pat. No. 3,027,346. As the support member 11 is formed by extrusion, as hereinafter described, the same will make contact with the conductors 12 in those areas not covered by tape foil 13 and will bond to such uncovered portions of the conductors 12. Such bonds are firm and not adversely affected by the extremely low temperatures within the cable.

Such spaced bondings of conductors 12 in respect to support member 11, allows the unbonded portions of said conductors 12 to bend away from the support member 11, with the differential thermal expansion coefficients of the metal of conductors 12 and the resin of support member 11. As the displaced portions of the conductors 12 will then extend toward the axis of member 11, the usual coolant such as liquid nitrogen or helium passing therethrough, will cool all surface portions of the displaced portions of the conductors 12.

Figure 2:
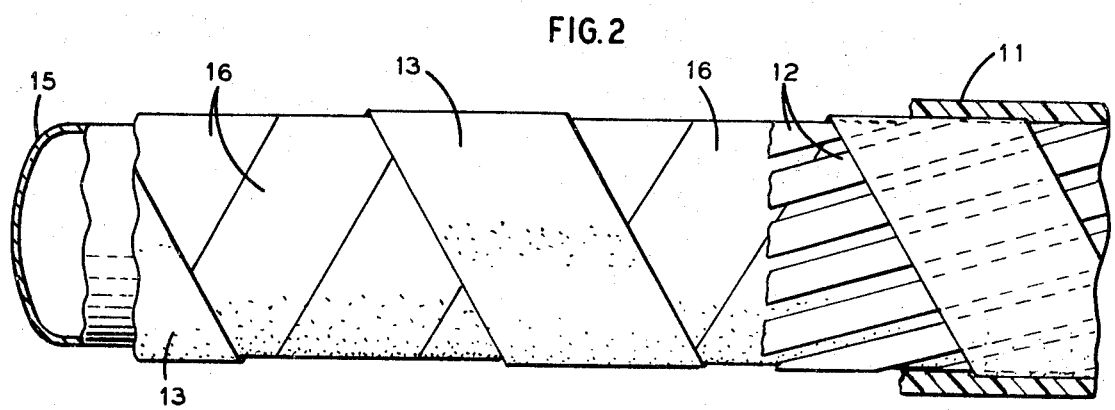
FIG. 2 is a view similar to that of FIG. 1, showing means for forming the conductor system.

The conductor arrangement of fig. 1, may be made as shown in FIG. 2. Here there is provided an inflatable tubular mandrel 15 which is stabilized by a helical wrapping 16 of paper or plastic. The conductors 12 are then stranded on the mandrel 15, over wrapping 16; the strands being disposed with a long lay and a selected spacing therebetween, to provide desired electrical field effects. The mandrel 15 permits the operations to be conducted with known stranding devices.

Over the conductors 12 there is helically wound the foil tape 13 with a selected spacing between the turns. The spacing of tape turns may be selected to correspond to the expected variation in the length of conductors 12. The synthetic resin support member 11, is now formed by extruding the monomer-modified polyethylene over the conductors 12, thus bonding the same through the spaces between foil tape turns 13, to the conductors 12. After cooling the extruded resin forms support member 11 in tubular form.

The mandrel 15 may now be deflated and together with wrapping 16, separated from the finished conductor system mounted on support member 11. It is understood that such supported conductor system may be assembled with the usual concentric heat-insulating tubings, not shown; with the usual coolant such as liquid nitrogen or helium being passed through the supported conductor system.

Figure 3:
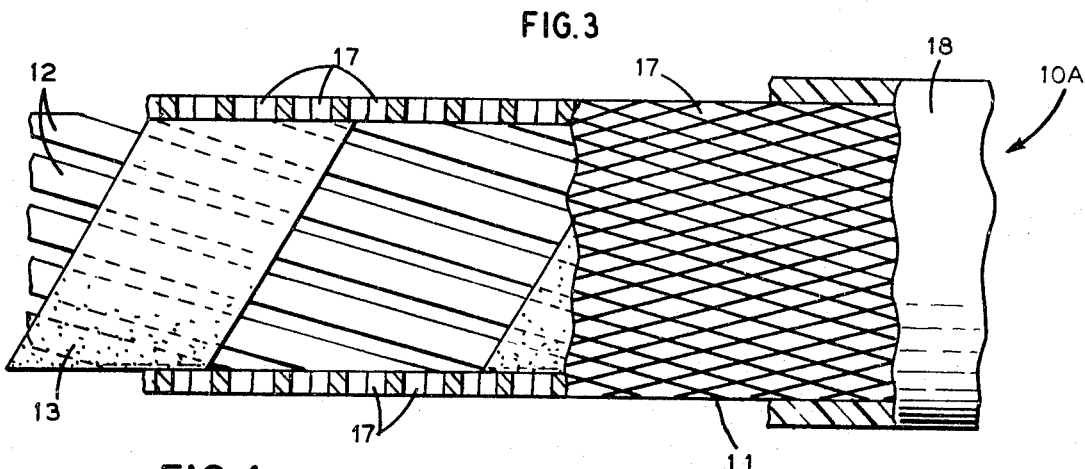
FIG. 3 is a view similar to that of FIG. 1, showing another embodiment of the invention.

In FIG. 3 there is shown another embodiment of the invention, wherein the supported conductor system 10A comprises the superconductor tapes 12, the helical foil 13 with spaced turns and the extruded tubular support member 11, as described before. However, the support member 11 is formed with diamond shaped openings 17 which will pass the coolant therethrough to saturate the insulating layer 18 overlying the tubular support member 11. The layer 18 may be of paper or plastic and any saturation thereof will increase the dielectric strength thereof. Loss of coolant is quite limited as the layer 18 will take up coolant only to the extent that it is unsaturated.

With the meshwork arrangement of openings 17, and rigid clamping of the opposite ends of support member 11, temperature variations along conductor system 10A will have little adverse effect as the radial contraction capability of the same is substantially increased.

In lieu of tape conductors 12, wires and members of varying cross section, may be used. Thus, with selected cross sections, the conductors may have a mechanical, as well as adherent engagement with support member 11. Such conductors may also be formed from various alloys, such as a nibium-zinc alloy as a very thin layer on a copper tape. Also, the tapes can be interconnected at their ends by butt or overlap joints.

It is also understood that the tubular support member 11 may be formed of synthetic resins which are not adherent to metal; in which case, the superconductor metal of tapes 12 is deposited on a synthetic resin carrier in adherent relation thereto; the carrier being also adherent to the resin of the support member 11. Various polyolefines may be used for the purpose. In this case, the resin may select for support member 11, which is insensitive to cold.

Figure 4:
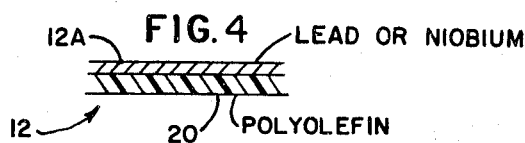
FIG. 4 is an enlarged view of an embodiment of a cross section of the superconductor.

FIG. 4 shows an embodiment of conductor 12, comprising a superconducting material 12A on a carrier 20 of synthetic material, polyolefin. In this embodiment the synthetic resin adheres to the superconductive metal and to the tubular member.

We claim:

1. A conductor system for superconducting cables comprising a tubular synthetic resin member for carrying a liquid coolant therethrough, elongated superconductive members mounted on the inner surface of said tubular member for contact with said coolant, said superconductive members being disposed at an angle to the longitudinal axis of said tubular member.

2. A system as in claim 1 wherein said tubular member has openings in the wall thereof.

3. A system as in claim 2 wherein said openings are arranged to form a meshwork.

4. A system as in claim 1 wherein said synthetic resin is a copolymer of polyethylene and monomers to render said resin adherent to said superconductive members.

5. A system as in claim 1, wherein said superconductive members have a predetermined spacing pattern therebetween.

6. A system as in claim 1, wherein said superconductive members are adherent at spaced intervals along the length thereof to opposed inner surface portions of said tubular member.

7. A system as in claim 1 wherein said superconductive members have a profiled cross section for mechanically interconnecting said members with said tubular member.

8. A system as in claim 1 wherein said superconductive members comprise a thin layer of superconductive metal and a layer of synthetic resin, said layer of synthetic resin being adherent to said superconductive metal and to said tubular member.

9. A system as in claim 1 and further including a tape of material wound helically with spaced turns between said superconductive members and said tubular member, the opposed portions of said superconductive members and said tubular member in the spaces between turns of said tape material being in adherent relation to each other.

* * * * *